United States Patent [19]
Severin et al.

[11] Patent Number: 4,943,559
[45] Date of Patent: Jul. 24, 1990

[54] DEVICE COMPRISING A TEMPERATURE SENSOR

[75] Inventors: Jan W. Severin; Gijsbertus De With, both of Eindhoven, Netherlands

[73] Assignee: U.S. Philips Corporation, New York, N.Y.

[21] Appl. No.: 316,394

[22] Filed: Feb. 27, 1989

[30] Foreign Application Priority Data

Mar. 7, 1988 [NL] Netherlands .......................... 8800556

[51] Int. Cl.$^5$ ........................ G10K 7/00; G01N 25/20
[52] U.S. Cl. ........................................ 505/1; 252/960; 374/176; 420/901; 505/701
[58] Field of Search ........................... 374/176; 427/62; 505/809, 847; 252/960

[56] References Cited

U.S. PATENT DOCUMENTS

| | | | |
|---|---|---|---|
| 2,980,808 | 4/1961 | Steele | 374/176 X |
| 3,156,539 | 10/1964 | Treaftis et al. | 420/901 X |
| 3,294,529 | 12/1966 | Haverstraw et al. | 420/901 X |
| 3,625,059 | 12/1971 | Camus et al. | 374/176 X |
| 4,739,382 | 4/1988 | Blouke et al. | 357/28 |

OTHER PUBLICATIONS

"Some Problems in Preparation of Superconducting Oxide Films on Ceramic Substrates", J. E. Journal of Applied Physics, vol. 26, No. 5, 5/1987, pp. L763-L765.

Philips Data Handbook-Integrated Circuits Book IC2, 1988, Linear Products, pp. 6-259.

"Bulk Superconductivity at 36k in La Se Cu O4", by R. J. Cava et al., Physical Review Letters, vol. 58, No. 4, pp. 408–410, 1/26/87.

"Superconductivity at 93k in a New Mixed Phase Y-Ba-Cu-O Compound System at Ambient Pressure", by M. K. Wu et al., Physical Review Letters, vol. 58, No. 9, pp. 908–910, 3/2/87.

*Primary Examiner*—Daniel M. Yasich
*Attorney, Agent, or Firm*—Norman N. Spain

[57] ABSTRACT

A temperature sensor comprises a thin layer of material the composition of which varies gradually over the layer thickness. The material is superconductive below a critical temperature the value of which depends on the composition of the material. The layer is connected, by means of electrodes to an electronic circuit for supplying current to the sensor and processing a temperature-dependent signal produced by the sensor.

3 Claims, 1 Drawing Sheet

DEVICE COMPRISING A TEMPERATURE SENSOR

BACKGROUND OF THE INVENTION

The invention relates to a device comprising a sensor for producing a temperature-dependent electric signal.

SUMMARY OF THE INVENTION

Such a device may be used for measuring and/or controlling the temperature in a space.

It is the object of the invention to provide a device which is particularly suitable for use at comparatively low temperatures at which some materials are superconductive.

For that purpose the device according to the invention is characterized in that the sensor comprises a thin layer of a material the chemical composition of which varies gradually over the layer thickness, which material is superconductive below a critical temperature the value of which temperature depends on the composition of the material, which layer is electrically connected, by means of electrodes (sensor electrodes), to an electronic circuit for supplying current to the sensor and processing the signal produced by the sensor.

DETAILED DESCRIPTION OF THE INVENTION

Figure 1:
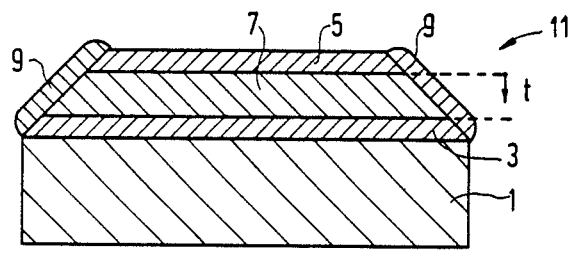
FIG. 1 is a cross-sectional view of an embodiment of a sensor suitable for the device according to the invention.

The invention will now be described in greater detail for a more complete understanding of the invention.

Examples of superconductive materials which can be obtained in thin layers with a composition varying gradually over the layer thickness and methods of obtaining such materials are described in prior Netherlands Patent Application No. 8701788 (PHN 12,209) Published Feb. 1, 1989 as EP No. 0301656 . Since the composition of the layer varies over its thickness the layer will be superconductive at a given temperature over a part of its thickness. When the temperature drops further the thickness of the layer that is superconductive increases. Since the critical current below which the layer is superconductive and above which the layer is no longer superconductive is proportional to the thickness of the layer, this current is a measure of the temperatures of the sensor. The device according to the invention enables the measurement of this critical current or the generation of a signal depending on the critical current which controls a device for influencing the temperature.

An embodiment of the device according to the invention with which the temperature of the sensor can be measured is characterized in that the electronic circuit comprises a controllable current source as well as a measuring circuit for measuring the electric voltage between the sensor electrodes and for supplying a control signal to the current source, in such a manner that the current supplied by the current source increases when the measured voltage is equal to zero and decreases when the measured voltage exceeds zero.

An embodiment of the device according to the invention with which the temperature in a cooled space can be maintained at a predetermined value is characterized in that the electronic circuit comprises a current source as well as measuring circuit for measuring the electric voltage between the sensor electrodes and for supplying a control signal to a heating circuit which comprises a heating element which is accommodated together with the sensor in a cooled space, which control signal ensures that an electric current is supplied to the heating element when the measured voltage is equal to zero and that the heating element is switched off when the measured voltage exceeds zero. A cooled space is to be understood to mean in this connection a space which is in thermal contact with a system which withdraws heat from the space.

A further embodiment in which no separate circuit is necessary to produce current for the heating element is characterized in that the heating element is connected in series with the current source and the sensor, the current source forming part of both the electronic circuit and the heating circuit.

The invention will now be described in greater detail with reference to the drawing.

In these figures all elements with identical numerals are the same.

The sensor shown diagrammatically in FIG. 1 comprises a substrate 1, for example of sapphire (aluminum oxide) on which a layer 3 of $LaMecuO_4$ is provided by means of vapour deposition, in which Me is selected from Ca, Sr and Ba. On this layer a $La_2CuO_4$ layers is provided, likewise by vapour deposition. As already described in the above mentioned Netherlands Patent Application No. 8701788 (PHN 12,209) a solid state diffusion reaction is carried out by heating of the assembly thus formed, so that between the two layers 3 and 5 a layer 7 is formed of the composition $La_{2-x}Me_xCuO_4$, wherein x gradually increases from the top downwards from 0 to 1. The possible variation of x as a function of the distance to the top surface of the layer 7 is shown graphically in FIG. 2.

The layers are then ground at an angle at two oppositely located ends to make the center layer 7 accessible. Gold electrodes 9 to the center layer 7 are provided by vapour deposition on the inclined surfaces thus formed to which connection wires (not shown) can be connected in a manner conventionally used in the manufacture of integrated circuits. Of course it is also possible to make the layer accessible in another manner to provide the electrodes 9, for example by making scratches in the top layer 5.

Figure 2:
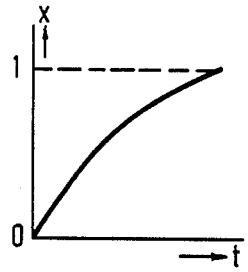
FIG. 2 shows graphically a possible variation of the material composition as a function of the place in a layer of the sensor shown in FIG. 1.
Figure 3:
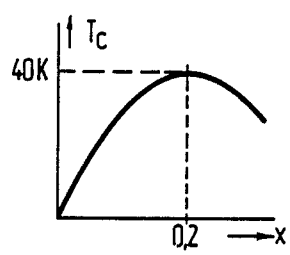
FIG. 3 shows graphically a possible relationship between the critical temperature and the material composition in the sensor shown in FIG. 1.

Below a given (the critical temperature Tc) the layer 7 has superconductive properties. This critical temperature $T_c$ depends on the composition of the layer and hence on the value of x. FIG. 3 shows the variation of $T_c$ as a function of x for the case in which strontium has been chosen for the metal Me. In that case $T_c$ maximally has a value of approximately 40° K for x=0.2. For other values of x $T_c$ is lower. Since x varies gradually over the thickness of the layer 7, as is shown in FIG. 2, only a very thin part of the layer 7 is superconductive at 40 K. Therefore as the temperature becomes lower, the thickness of the part that is superconductive increases since in that case the parts of the layer 7 where x deviates slightly from 0.2 also become superconductive.

The maximum current which a superconductive layer can convey without losing its superconductive properties depends on the thickness of the layer. When, as described hereinbefore, the thickness of the layer that is superconductive increases with decreasing temperature the value of the said critical current strength also increases. The variation of the critical current strength $T_c$ as a function of the temperature T is shown graphically in FIG. 4. By measuring the critical current of the sensor described the temperature of the sensor and hence the temperature of, for example, a space in which the sensor is present, or an article with which the sensor is in thermal contact can hence be measured.

The exact variation of $I_c$ as a function of T depends, of course, on the materials from which the sensor is manufactured and on the details of the manufacturing process. Examples of various useful compositions and methods of manufacturing are described in the said prior Netherlands Patent Application No. 8701788 (PHN 12,209).

Figure 5:
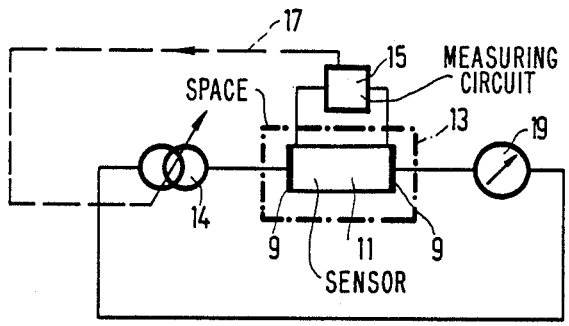
FIG. 5 is a block diagram of a first embodiment of a device according to the invention.

FIG. 5 shows a block diagram of an embodiment of a device for measuring the temperature by determining the critical current strength of a sensor 11 of the type shown in FIG. 1. The sensor 11 is present in a cooled space 13 denoted by a dot-and-dash line, the temperature of which is to be measured. The electrodes 9 of the sensor 11 are connected to an electronic circuit which comprises a controllable current source 14 for supplying current to the sensor, as well as a measuring circuit 15 for measuring the voltage between the electrodes. As is shown by the broken line 17 the measuring circuit 15 provides a control signal which controls the current source 14. The measuring circuit 15 may comprise, for example, a threshold discriminator which supplies a first voltage when the voltage between the electrodes 9 exceeds zero and which supplies a second voltage when the voltage across the electrodes is equal to zero. The current source 14 is designed so that in the former case the supplied current decreases and in the latter case the supplied current increases. As a result of this the current adjusts so that the layer 7 of the sensor 11 fluctuates continuously between the superconductive state and the non-superconductive state. This means that the adjusted current is substantially equal to the critical current $I_c$.

Figure 4:
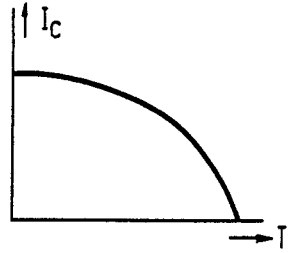
FIG. 4 shows graphically a possible relationship between the critical current strength and the temperature of the sensor shown in FIG. 1.

The temperature of the sensor and hence of the space 13 may be read from the graph associated with the sensor 11 in question of the type shown in FIG. 4. The current can be read on an ammeter 19 which is connected in series with the current source 14 and the sensor 11 and which is preferably converted temperature-units, so that the conversion via the graph of FIG. 4 is no longer necessary.

Figure 6:
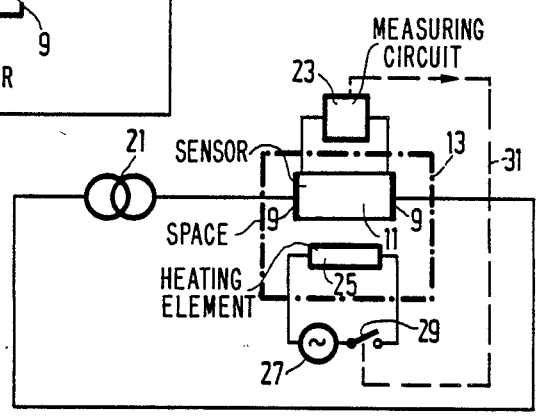
FIG. 6 is a block diagram of a second embodiment.

FIG. 6 shows a block diagram of a first embodiment of a device for controlling the temperature by means of a sensor 11 of the type shown in FIG. 1. In this case too the sensor is present in a cooled space 13 denoted by a dot-and-dash line, for example, it is present in a cryostat filled with liquid nitrogen (not shown). The electrodes 9 of the sensor 11 are connected to an electronic circuit which on the one hand comprises a previously adjusted current source 21 for supplying current to the sensor and on the other hand comprises a measuring circuit 23 which may be of approximately the same type as the measuring circuit 15 used in the device shown in FIG. 5. In addition to the sensor 11 the space 13 comprises a heating element 25 (for example a resistor) which forms part of a heating circuit which further comprises a voltage source 27 and a switch 29. The measuring circuit 23 produces a control signal which, as is shown diagrammatically by the broken line 31, controls the switch 29 which may be, for example, a transistor. When the voltage between the electrodes 9 of the sensor 11 is equal to zero, the measuring circuit 23 provides a first control signal which closes the switch 29 so that the voltage source 27 provides an electric current to the heating element 25 as a result of which the space 13 is heated. The sensor 11 the temperature of the space 13 and as a result of this the layer 7 comes into the non-superconductive state when the temperature has risen to a value at which the critical current strength $I_c$ corresponds to the previously adjusted current strength of the current source 21. The voltage between the electrodes 9 then exceeds zero and the measuring circuit 23 provides a second control signal which opens the switch 29 so that the heating element 25 is switched off. Due to the cooling the temperature in the space 13 then decreases again until the layer 7 of the sensor 11 again comes into the super-conductive state. The temperature of the space 13 then fluctuates around a value which is determined by the value of the current supplied by the current source 21. By varying the current source 21 the temperature of the space 13 may hence be varied.

Figure 7:
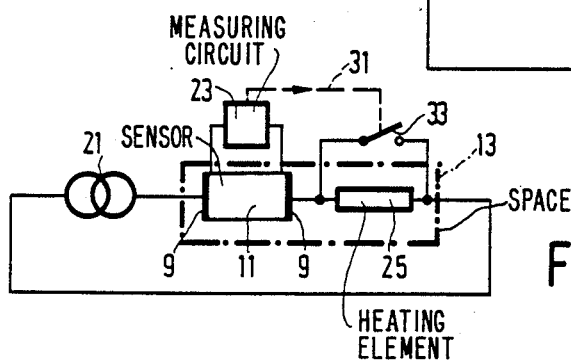
FIG. 7 is a block diagram of a third embodiment.

FIG. 7 shows a block diagram of a second, simplified embodiment for controlling the temperature by means of a sensor of the type shown in FIG. 1. The sensor 11 is again present in a cooled space 13 indicated by a dot-and-dash line. The electrodes 9 of the sensor 11 are connected to an electronic circuit. This circuit comprises on the one hand the previously adjusted current source 21 and the heating element 25 which is also accommodated in the space 13 and, the current source and the heating element in this case being connected in series with the sensor. On the other the electronic circuit comprises the measuring circuit 23 which measures the voltage between the electrodes 9 and produces a control signal dependent on the said voltage, which operates a switch 33 connected parallel to the heating element as is indicated by the broken line 31. In this embodiment the measuring circuit 23 and the switch 33 are designed so that the switch is closed when the voltage between the electrodes 9 exceeds zero, while the switch is open when said voltage is equal to zero. As a result of this it is achieved that the current supplied by the current source 21 passes through the heating element 25 when the layer 7 of the sensor 11 is superconductive and that the heating element 25 is short circuited by switch 33 when the said layer is not superconductive. As a result of this the temperature of the space 13 adjusts again so that the temperature of the layer 7 fluctuates around a value which is associated with a critical current strength $I_c$ which is substantially equal to the current strength provided by the current source 21. The result thus is the same as in the FIG. 6 embodiment but the device is simpler in that the separate voltage source 27 for supplying the heating element 25 is omitted. Its function is taken over by the current source 21 which forms part of both the electronic circuit and the heating circuit.

We claim:

1. A device comprising a sensor (11) for producing a temperature dependent electric signal wherein the sensor (11) comprises a thin layer of a material (7), the composition of which layer (7) varies gradually over the layer thickness, provided on a substrate (1), which layer is superconductive below a critical temperature the value of which depends on the composition of the material, and which layer is connected electrically by means of electrodes (9) to an electronic circuit for supplying current to the sensor and processing the signal produced by the sensor and wherein said electronic circuit comprises a current course (21) as well as a measuring circuit (23) for measuring the electric voltage between the sensor electrodes (9) and for supplying a control signal to a heating circuit which comprises a heating element (25) which is accommodated together with the sensor (11) in a cooled space (13) and which heats said cooled space (13) when supplied with said electric current, which control signal ensures that an electric current is supplied to the heating element when the measured voltage is equal to zero and that the heating element is switched off when the measured voltage exceed zero.

2. A device as claimed in claim 1, wherein the heating element (25) is connected in series with the current source (21) and the sensor (11), the current source forming part of both the electronic circuit and the heating circuit.

3. A device comprising a sensor (11) for producing a temperature dependent electric signal wherein the sensor (11) comprises a thin layer (7) of a material, the composition of which material varies gradually over the layer thickness, provided on a substrate (1), which layer (7) is superconductive below a critical temperature the value of which depends on the composition of said material, which layer (7) is provided with the electrodes (9) and which layer is connected electrically by means of said electrodes (9) by electric connecting means to an electronic circuit for supplying current to the sensor and processing the signal produced by the sensor and wherein the electronic circuit comprises a controllable circuit source (14) as well as a measuring circuit (15) for measuring the electrical voltage between the electrodes (9), said voltage being equal to zero when said layer (7) is superconductive, and for supplying a control signal to said current source (14), said measuring circuit (15) supplying a first voltage to said current source (14) where the voltage measured between said electrodes (9) is equal to zero and a second voltage to said current source (14) when the voltage measured between the electrodes (9) exceeds zero, said current source (14) being adapted to increase the current supplied to said sensor upon receipt of said first voltage and to decrease the current supplied to said sensor upon receipt of said second voltage.

* * * * *